United States Patent [19]

Himuro

[11] Patent Number: 5,707,461
[45] Date of Patent: Jan. 13, 1998

[54] PNEUMATIC TIRES FOR PASSENGER CARS

[75] Inventor: Yasuo Himuro, Tachikawa, Japan

[73] Assignee: Bridgestone Corporation, Tokyo, Japan

[21] Appl. No.: 561,855

[22] Filed: Nov. 22, 1995

[30] Foreign Application Priority Data

Nov. 22, 1994 [JP] Japan .................... 6-287699

[51] Int. Cl.⁶ .......................... B60C 115/00
[52] U.S. Cl. ................. 152/209 R; 152/209 D
[58] Field of Search ............... 152/209 R, 209 D

[56] References Cited

U.S. PATENT DOCUMENTS

| | | | |
|---|---|---|---|
| 1,036,516 | 8/1912 | Beitler | 152/209 R |
| 1,127,517 | 2/1915 | Richardson | 152/209 R |
| 4,057,089 | 11/1977 | Johannsen | 152/209 R |
| 4,962,801 | 10/1990 | Tsuda | 152/209 |
| 5,109,903 | 5/1992 | Watanabe et al. | 152/209 |
| 5,234,042 | 8/1993 | Kuhr et al. | 152/209 R |
| 5,327,952 | 7/1994 | Glover et al. | 152/209 R |
| 5,421,391 | 6/1995 | Himuro | 152/209 R |
| 5,609,699 | 3/1997 | Himuro | 152/209 D |

FOREIGN PATENT DOCUMENTS

| | | |
|---|---|---|
| 0 565 270 | 10/1993 | European Pat. Off. . |
| 0 590 526 | 4/1994 | European Pat. Off. . |
| 0 593 288 | 4/1994 | European Pat. Off. . |
| 2 655 920 | 6/1991 | France . |
| 1004948 | 3/1957 | Germany ............... 152/209 R |
| 36506 | 2/1989 | Japan ................... 152/209 D |
| 141310 | 5/1990 | Japan ................... 152/209 R |
| 257706 | 9/1992 | Japan ................... 152/209 R |
| 319025 | 12/1993 | Japan ................... 152/209 D |
| 2239845 | 7/1991 | United Kingdom ........ 152/209 D |

*Primary Examiner*—Steven D. Maki
*Attorney, Agent, or Firm*—Sughrue, Mion, Zinn, Macpeak & Seas, PLLC

[57] ABSTRACT

A pneumatic tire for passenger car has a directional tread pattern defined by at least one circumferential rib and a plurality of directional slant grooves, in which at least the directional slant grooves include directional low-slant grooves each having a smaller inclination angle with respect to the circumferential direction, and a block among plural blocks formed between the adjoining directional low-slant grooves at given intervals in the circumferential direction is at least adjacent to the circumferential rib and has a relation that a height of a preceding ground contact side is lower than a height of a later ground contact side during the forward rotation of the tire.

8 Claims, 3 Drawing Sheets

FIG_1a
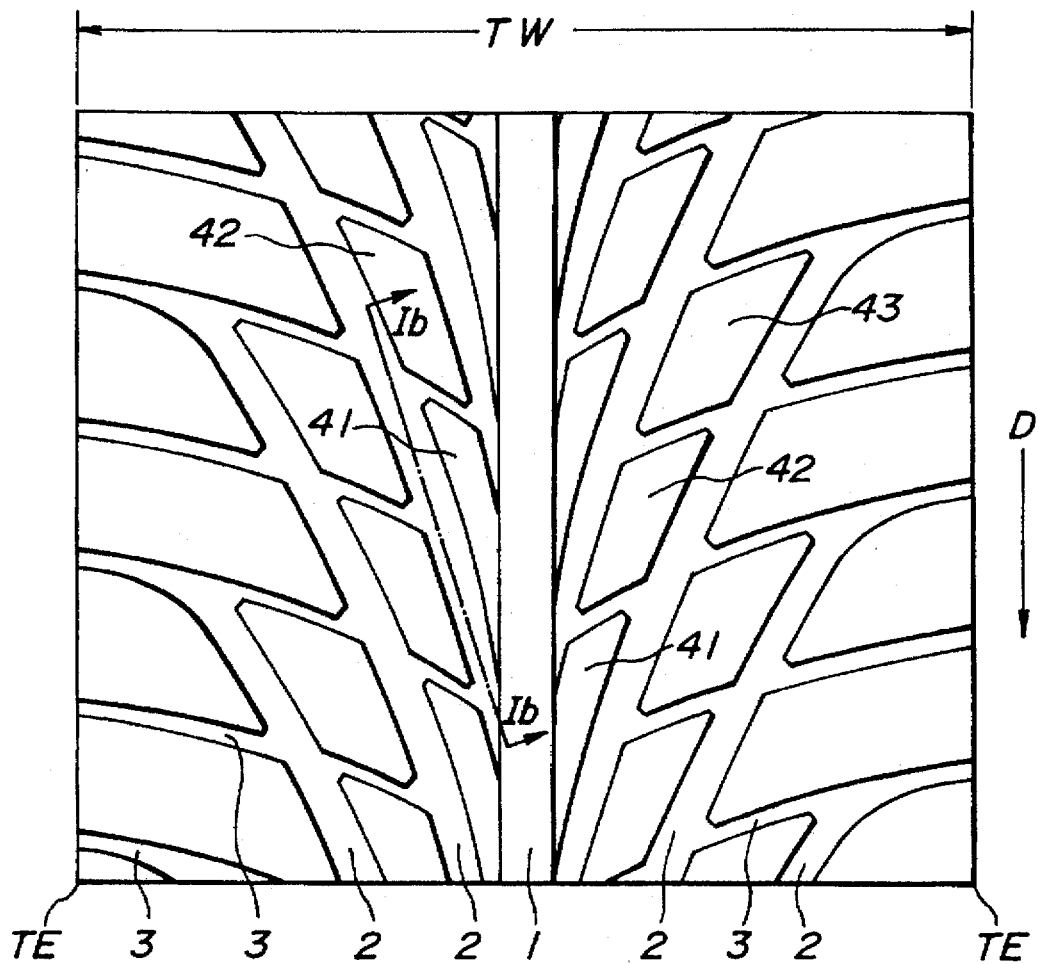
FIG_1b
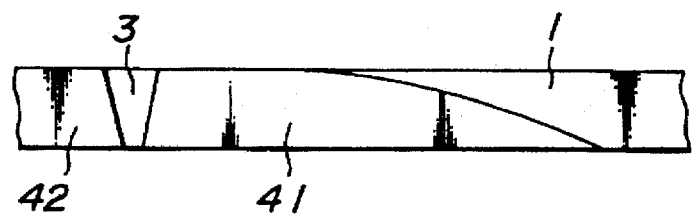

FIG_2a
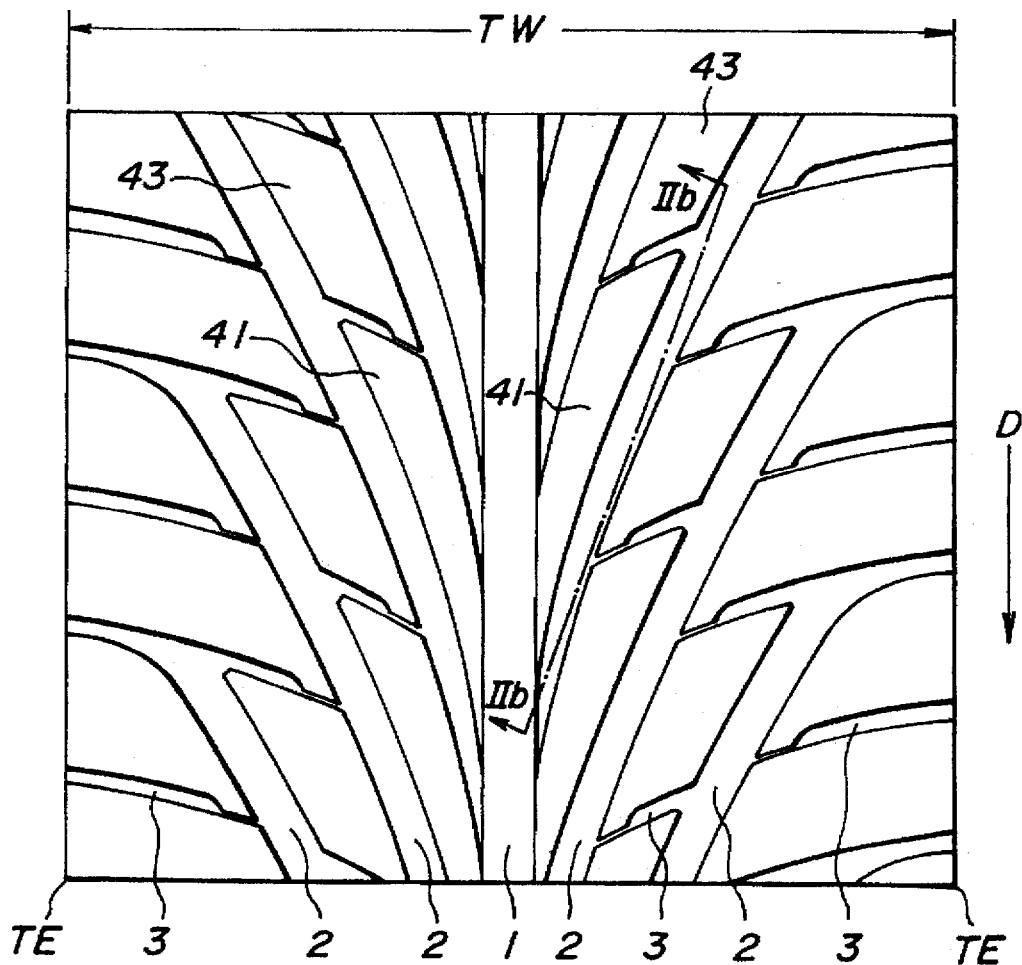
FIG_2b
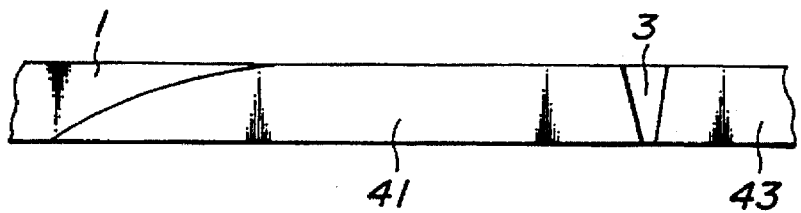

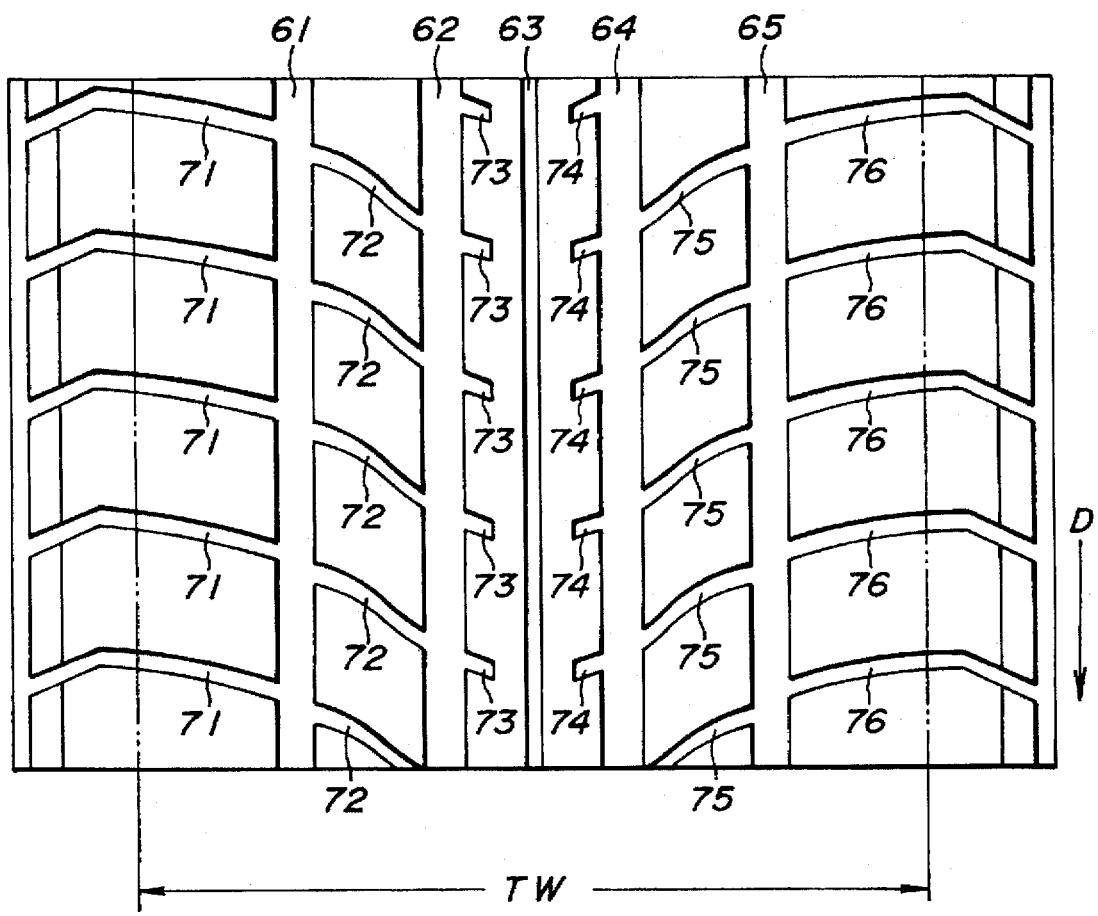
FIG_3
*PRIOR ART*

PNEUMATIC TIRES FOR PASSENGER CARS

BACKGROUND OF THE INVENTION

1. Field of the Invention

This invention relates to a pneumatic tire for passenger cars, and more particularly to a high-performance pneumatic tire developing excellent running performance even in sport running and controlling pattern noise to a low level without sacrificing wet-running performance.

2. Description of the Related Art

In FIG. 3 is shown a typical example of the conventional tread pattern in the conventional high-performance pneumatic tires for passenger cars. That is, the conventional tire has a tread pattern defined by several circumferential grooves (four grooves in the illustrated embodiment, generally about 2-8 grooves) and many directional slant grooves arranged at given intervals in the circumferential direction.

The term "circumferential groove" used herein means a straight groove continuously extending in the circumferential direction of the tire or a substantially straight groove, and the term "circumferential rib" used herein means a rib continuously or substantially continuously extending in the circumferential direction. The term "directional slant groove" used herein means a groove slantly extending with respect to the circumferential direction or a groove indicating the rotating direction of the tire when the tire is mounted onto a vehicle or forming so-called directional tread pattern in which a portion of the slant groove near to an equatorial plane of the tire first contacts the ground during the running of the tire and a portion of the slant groove apart from the equatorial plane contacts the ground later.

In the conventional tire as mentioned above, in order to effectively enhance the steering stability and resistance to hydroplaning a wet road surface, it is frequently adopted to increase the number of grooves or the groove width to increase a negative ratio (ratio of groove surface area to area of ground contact region of tread), and particularly to increase the negative ratio of the directional slant groove.

However, it has been confirmed that the level of pattern noise undesirably increases in the pneumatic tire provided with the directional tread pattern having an improved wet-running performance by the above method. The pattern noise of the tire comprises various factors. A beat sound produced when the tire contacts with ground during the running under load is one of the above factors. Particularly, it has been confirmed that pattern noise of the above beat sound component is extremely large in the tire having directional slant grooves at a high negative ratio.

On the other hand, there is known a tire having a combination of a relatively wide straight groove continuously extending in the circumferential direction for the improvement of drainage property and arranged in a central portion of the tread or so-called aqua channel and a plurality of directional slant grooves arranged at given intervals in the circumferential direction. This tire is excellent in drainage property, but is poor in the steering stability at a slight steering angle such as straight running performance or the like, so that it is unsuitable as a high-performance tire having excellent running performances even in sport running.

SUMMARY OF THE INVENTION

It is, therefore, an object of the invention to provide a novel tread pattern used in high running-performance pneumatic tires for passenger cars developing excellent running performances even in sport running and having an excellent wet-running performance and controlling pattern noise to a low level.

According to the invention, there is the provision of a pneumatic tire for passenger cars having a directional tread pattern defined by at least one circumferential rib and a plurality of directional slant grooves arranged on both sides of the circumferential rib at given intervals in a circumferential direction of the tire, in which at least the directional slant grooves include directional low-slant grooves each having a smaller inclination angle with respect to the circumferential direction at a side near to an equatorial plane of the tire and extending from each side of the circumferential rib toward a side end of a tread, and plural blocks are formed between the adjoining directional low-slant grooves at given intervals in the circumferential direction, and a block at least adjacent to the circumferential rib among these blocks has a relation that a height of a preceding ground contact side is lower than a height of a later ground contact side during the forward rotation of the tire.

In a preferable embodiment of the invention, the height of the preceding ground contact side of the block is the same level as the bottom of the directional low-slant groove adjacent to the block.

In another preferable embodiment of the invention, the directional slant grooves include directional high-slant grooves each having a large inclination angle with respect to the circumferential direction in addition to the directional low-slant grooves.

In the other preferable embodiment of the invention, the directional low-slant groove and/or the directional high-slant groove are opened at a side end of the tread.

In the further preferable embodiment of the invention, the inclination angle of the directional slant groove with respect to the circumferential direction is not less than 45° in case of the directional high-slant groove and not more than 30° in case of the directional low-slant groove.

BRIEF DESCRIPTION OF THE DRAWINGS

The invention will be described with reference to the accompanying drawings, wherein:

FIG. 1a is a diagrammatically developed view of a tread pattern in a first embodiment of the pneumatic tire for passenger car according to the invention;

FIG. 1b is a side view taken along a line Ib—Ib viewing from a directional slant groove;

FIG. 2a is a diagrammatically developed view of a tread pattern in a second embodiment of the pneumatic tire for passenger car according to the invention;

FIG. 2b is a side view taken along a line IIb—IIb viewing from a directional slant groove; and FIG. 3 is a diagrammatically developed view of a tread pattern in the conventional pneumatic tire.

DESCRIPTION OF THE PREFERRED EMBODIMENTS

In the pneumatic tire for passenger car according to the invention, many directional low-slant grooves each having a small inclination angle with respect to the circumferential direction are arranged at give intervals in the circumferential direction as mentioned above, so that the wet-running performance is excellent. However, when the tread pattern is formed only by the directional low-slant grooves, it is difficult to ensure sufficient block rigidity and hence it is apt to cause a drawback in the steering stability.

According to the invention, the tread pattern is formed by at least one circumferential rib in addition to the above directional slant grooves, so that desired rigidity is given to the tread pattern by the circumferential rib and hence a response to the steering wheel at a slight steering angle becomes higher to enhance so-called "firmly feeling" given to a driver, whereby the straight running performance is improved and also pattern noise is reduced owing to smooth contact with the ground. The circumferential rib is preferably so-called center rib arranged in a central region of the tread, but may be located within a range of from tread center to a position corresponding to about ⅓ of a tread width in case of unsymmetrical tread pattern. Alternatively, two circumferential ribs may be arranged in the central region of the tread to form a so-called center groove.

Furthermore, in the tread pattern according to the invention, blocks are formed between the adjoining directional low-slant grooves at intervals in the circumferential direction and a height of a block at least adjacent to the circumferential rib among these blocks is gradually increased from a preceding ground contact side toward a later ground contact side during the forward running of the tire, so that the wet-running performance can be more improved while ensuring the rigidity of the rib.

Particularly, the circumferential rib is supported by the block adjacent thereto among the blocks arranged between the adjoining directional low-slant grooves at intervals in the circumferential direction, so that the width of the circumferential rib can be narrowed as compared with that in the conventional tread pattern of the high-performance pneumatic tire for passenger cars (shown in FIG. 3 as a typical example).

The invention will be described with respect to the following examples by reference to the drawings. In FIGS. 1a and 2a are shown tread patterns of Examples 1 and 2 in the pneumatic tire for passenger car according to the invention, respectively. These tires have a tire size of 225/50R16 and a tread width (TW) of about 200 mm.

The pneumatic tire of Example 1 shown in FIG. 1 has a tread pattern comprising one circumferential rib 1 arranged in a central region of a tread and a plurality of directional slant grooves 2, 3 arranged on both sides of the circumferential rib 1 at given intervals in the circumferential direction of the tire.

These directional slant grooves comprise many directional low-slant grooves 2 each having a small inclination angle of 10°–30° with respect to the circumferential direction and many directional high-slant grooves 3 each having a large inclination angle of 60°–80° with respect to the circumferential direction. These directional slant grooves are curvedly extended so that the inclination angle with respect to the circumferential direction is made smaller in a region near to an equatorial plane than in a region apart from the equatorial plane, and first contact the ground at a portion near to the equatorial plane and later contact the ground at a portion apart from the equatorial plane when the tire is mounted onto a vehicle in a forward direction of the tire shown by an arrow D, whereby so-called directional tread pattern is formed. Thus, when the mounted state of the tire onto the vehicle is viewed from front, the tread is provided with a plurality of directional slant grooves each bordering around a central region of the tread and gradually enlarging from downward toward upward.

Blocks (41, 42, 43) are formed between the adjoining directional low-slant grooves 2 at intervals in the circumferential direction. Among these blocks, the block 41 adjacent to the circumferential rib 1 is joined to the rib and has a surface such that a height of a preceding ground contact side is lower than a height of a later ground contact side during the forward rotation of the tire and the height of the preceding ground contact side of the block is the same level as the bottom of the directional low-slant groove adjacent to the block as shown in FIG. 1b. In other words, the surface of the block 41 is slantly cut out so that the height of the preceding ground contact side of the block is equal to the groove depth of the directional low-slant groove.

As can be seen from FIG. 1a and FIG. 1b, a trailing edge of the block 41 is defined by a high slant groove, the height of a portion of the block at the trailing edge of the block is substantially the same as the height of the rib, the surface of the block and a sidewall of the rib intersect so as to define a line which is inclined with respect to the radial direction of the tire.

The directional high-slant groove 3 is opened at a side end of the tread TE to serve as a discharge port of water between the ground contact region of the tire tread and the road surface.

The pneumatic tire of Example 2 shown in FIG. 2 is basically the same as the pneumatic tire of Example 1 shown in FIG. 1 except that a part of the directional high-slant groove 3 is narrowed in form of a slit and the directional high-slant grooves 3 are arranged in the vicinity of the side end TW of the tread apart from the central region of the tread so as to form somewhat longitudinally long blocks 41, 43. That is, this tire is to improve the pattern noise with slightly sacrificing the drainage property as compared with the pneumatic tire of Example 1.

The pneumatic tire of the conventional example shown in FIG. 3 is a typical embodiment of the conventional tread pattern comprising five circumferential grooves 61, 62, 63, 64, 65 and many directional slant grooves 71, 72, 73, 74, 75 arranged at intervals in the circumferential direction. This tire has a tire size of 225/50R16 and a tread width TW of about 200 mm, which are the same as those of the above examples.

The circumferential groove 63 arranged in the center of the tread is a narrow groove having a width of 4 mm, and a pair of circumferential grooves 62, 64 having a width of 11 mm are arranged on both sides of the groove 63, and further a pair of circumferential grooves 61, 65 having a width of 10 mm are arranged so as to extend from a side end of the tread toward the tread center up to positions corresponding to about ¼ of the tread width. In the tire, the four thick circumferential grooves (61, 62, 64, 65) and the multiple directional slant grooves (71, 72, 73, 74, 75) largely contribute together to improve the drainage property when the tire is run on wet road surface.

The tests for evaluating the resistance to hydroplaning, pattern noise and steering stability on dry road surface are made with respect to each of the pneumatic tires for passenger cars of Examples 1 and 2 and Conventional Example under an internal air pressure of 2.3 kgf/cm². The resistance to hydroplaning in the straight running is evaluated by measuring a remaining area of ground contact region when the tire is run at a speed of 80 km/h or 90 km/h on a wet road surface having a water depth of 5 mm, and the resistance to hydroplaning in the cornering is evaluated by measuring a limit lateral G when the tire is cornered on a wet road surface having a water depth of 5 mm, and the pattern noise is evaluated by the feeling of a test driver on indoor sound when the tire is inertially run on a straight smooth course after the stop of an engine at a speed of 100 km/h, and the steering stability on dry road surface is evaluated by the feeling of a test driver when the tire is run on a circuit course at dry state by various sport running modes.

The evaluated results are shown in Table 1, in which each result is represented by an index value on the basis that the conventional tire is 100. The larger the index value, the better the result.

TABLE 1

|  | Conventional Example | Example 1 | Example 2 |
|---|---|---|---|
| Resistance to hydroplaning: straight running | 100 | 120 | 115 |
| Resistance to hydroplaning: cornering | 100 | 115 | 110 |
| Pattern noise | 100 | 105 | 110 |
| Steering stability on dry road surface | 100 | 105 | 105 |

As seen from Table 1, the pneumatic tires of Examples 1 and 2 according to the invention are excellent in the resistance to hydroplaning, pattern noise and steering stability on dry road surface as compared with the conventional pneumatic tire.

As mentioned above, the invention can provide pneumatic tires for passenger cars having excellent drainage property and steering stability and low pattern noise because the directional low-slant grooves and the circumferential rib are adequately arranged in the tread and the blocks are formed between the adjoining directional low-slant grooves at intervals in the circumferential direction and the block among these blocks has a relation that the height of the preceding ground contact side is lower than the height of the later ground contact side in the forward direction of the tire.

What is claimed is:

1. A pneumatic tire for passenger cars comprising; a directional tread pattern defined by at least one circumferential rib and a plurality of directional slant grooves arranged on both sides of the circumferential rib at given intervals in a circumferential direction of the tire, at least the directional slant grooves including directional low-slant grooves each having a small inclination angle with respect to the circumferential direction at a side near to an equatorial plane of the tire and extending from each side of the circumferential rib toward a side end of a tread, the directional slant grooves including directional high-slant grooves each having a large inclination angle with respect to the circumferential direction in addition to the directional low-slant grooves, and wherein plural blocks are formed between adjacent directional low-slant grooves at given intervals in the circumferential direction, and a block among said plural blocks is joined to the rib and has a surface such that a height of a preceding ground contact side of the block is lower than a height of a subsequent ground contact side of the block during the forward rotation of the tire, a trailing edge of the block is defined by a high slant groove, the height of a portion of the block at said trailing edge of the block is substantially the same as the height of the at least one rib, the surface of the block and a sidewall of the rib intersect so as to define a line which is inclined with respect to the radial direction of the tire.

2. A pneumatic tire according to claim 1, wherein the height of the preceding ground contact side of the block is the same level as the bottom of a directional low-slant groove adjacent to the block.

3. A pneumatic tire according to claim 1, wherein the directional low-slant grooves and/or the directional high-slant grooves are opened at a side end of the tread.

4. A pneumatic tire according to claim 1, wherein the inclination angle of each directional high-slant groove is not less than 45° and the inclination angle for each low-slant groove is not more than 30°.

5. A pneumatic tire according to claim 1, wherein the inclination angle of each high-slant groove is in the range of 60°–80°.

6. A pneumatic tire according to claim 1, wherein the inclination angle for each low-slant groove is in the range of 10°–30°.

7. A pneumatic tire according to claim 1, wherein said high-slant grooves have a narrowed portion.

8. A pneumatic tire according to claim 7, wherein said high-slant grooves intersect with said low-slant grooves and said narrowed portion is adjacent to said intersection of said low-slant and said high-slant grooves.

* * * * *

UNITED STATES PATENT AND TRADEMARK OFFICE
CERTIFICATE OF CORRECTION

PATENT NO. : 5,707,461
DATED : January 13, 1998
INVENTOR(S) : Yasuo Himuro

It is certified that error appears in the above-identified patent and that said Letters Patent is hereby corrected as shown below:

Title page,
Item [30], Foreign Application Priority Data

Nov. 22, 1994 [JP] Japan 6-287669

Signed and Sealed this

Sixteenth Day of October, 2001

Attest:

NICHOLAS P. GODICI
Attesting Officer    Acting Director of the United States Patent and Trademark Office